(12) United States Patent
Koetter et al.

(10) Patent No.: US 8,256,413 B2
(45) Date of Patent: Sep. 4, 2012

(54) PARABOLIC TROUGH COLLECTOR

(75) Inventors: Jens Koetter, Kaarst (DE); Gerhard Weinrebe, Leinfelden-Echterdingen (DE); Axel Schweitzer, Herrenberg (DE); Mathias Widmayer, Dettingen/Erms (DE); Wolfgang Schiel, Stuttgart (DE)

(73) Assignee: Flagsol GmbH, Cologne (DE)

( * ) Notice: Subject to any disclaimer, the term of this patent is extended or adjusted under 35 U.S.C. 154(b) by 166 days.

(21) Appl. No.: 12/713,536

(22) Filed: Feb. 26, 2010

(65) Prior Publication Data
US 2011/0048405 A1    Mar. 3, 2011

(30) Foreign Application Priority Data

Aug. 28, 2009 (DE) .......................... 10 2009 039 021
Jan. 29, 2010 (DE) ..................... 20 2010 001 474 U

(51) Int. Cl.
*F24J 2/12* (2006.01)
(52) U.S. Cl. ......... 126/600; 126/684; 126/694; 126/696
(58) Field of Classification Search .................. 126/600, 126/684, 694, 696
See application file for complete search history.

(56) References Cited

U.S. PATENT DOCUMENTS

| 2,182,222 A | 12/1939 | Courtis et al. |
| 4,178,913 A | 12/1979 | Hutchison |
| 4,484,568 A | 11/1984 | Witt |
| 4,628,142 A * | 12/1986 | Hashizume .................. 136/246 |

FOREIGN PATENT DOCUMENTS

| EP | 1947403 | 7/2008 |
| WO | WO 02/103256 | 12/2002 |
| WO | WO2005/066553 | 7/2005 |

* cited by examiner

*Primary Examiner* — Alfred Basichas
(74) *Attorney, Agent, or Firm* — Occhiuti Rohlicek & Tsao LLP

(57) ABSTRACT

A parabolic trough collector includes a parabolic mirror support structure with a parabolic mirror surface applied thereto, and an absorber support structure supporting an absorber tube. The parabolic mirror support structure and the absorber support structure are mechanically fastened in a fixed position relative to one another on a torsion tube that is arranged below the parabolic mirror surface, and mounted together with the parabolic mirror surface in a fashion capable of rotation about a parabolic trough collector longitudinal rotation axis. The torsion tube is arranged such that the parabolic trough collector longitudinal rotation axis coincides with the central longitudinal axis of the torsion tube.

20 Claims, 2 Drawing Sheets

PARABOLIC TROUGH COLLECTOR

FIELD OF DISCLOSURE

This disclosure is directed to solar energy systems, and in particular to systems for collection of solar energy.

CROSS-REFERENCE TO RELATED APPLICATIONS

This application claims the benefit of the priority dates of German Application No. 102009039021.9, filed on Aug. 28, 2009 and German Application No. 202010001474.3. filed Jan. 29, 2010. The contents of these applications are hereby incorporated by reference in their entirety.

BACKGROUND

In order to exploit solar energy, use is made of solar-thermal power plants in which the insolation is captured in the form of a plurality of silvered parabolic troughs connected in series and/or parallel, and is reflected onto an absorber line. Transported in the absorber line is a heat carrying medium that absorbs the thermal energy obtained from the irradiation and transports it further for the purpose of generating steam in the solar power plant. The silvered parabolic troughs have a support structure on which the silvered elements are arranged and made to track the sun's path. The mirror elements, and thus also the parabolic troughs have an aperture (distance between the outer mirror edges) of approximately 6 m. A parabolic trough collector may comprise a plurality of elements which are respectively arranged rigidly on the distortion-resistant parabolic mirror support structure. In this case, an element is then located between two spaced-apart support pylons or support posts that support it. The individual elements are of identical design, and between two elements connected one behind another in series there is located in the middle between two support pylons or support posts a drive unit with the aid of which the two elements or all the elements forming a parabolic trough collector can be made to track the sun simultaneously and uniformly on one axis. The movement is usually effected here with the aid of hydraulic cylinders that use levers, which are connected to the parabolic mirror support structure, to rotate the parabolic mirror support structure in the form of a lattice frame about a rotation axis. Here, the construction in the case of plants known in practice is such that the rotation axis runs above the mirror surface, or at least at the point of origin or vertex of the parabolic mirror curve. The result of this is that the mirror surface is interrupted in the longitudinal direction of the parabolic trough collector in the region where the drive unit effecting the swiveling of the elements of the parabolic trough collector, and so it is not possible to design the entire length of a parabolic trough collector as mirror surface for utilizing sunlight. Moreover, it is necessary in the case of this construction to provide solid gusset plates at the final points of turning and rotation of a collector element in order to be able to absorb and transmit the forces of rotation and torsion occurring here.

As is known, for example, from the generic WO 2005/066553 A1, there are, however, also constructions in the case of which instead of a torque lattice frame the parabolic mirror support structure has a torsion tube that supports the parabolic mirror support structure. However, even in this case the drive unit is arranged between two parabolic trough collector elements and effects an interruption of the parabolic mirror surface of the parabolic trough collector. The parabolic trough collector longitudinal rotation axis, cooperating with the actuating element to move the parabolic mirror support structure, of a primary plate there is arranged in the radial direction of the primary plate of the central longitudinal axis of the torsion tube supporting the parabolic mirror support structure.

Also known in practice are torsion tubes that have lugs which are welded on the outer periphery and on which support frame structures are fitted, on which the mirror surfaces are fastened. With such torsion tubes it is then necessary to fit on the outer lateral surface support elements that form the absorber support structure and support the absorber tube, and this is done by welding, in particular. Such support elements are approximately two meters long and in the event of a rotational or swiveling movement of the parabolic trough collector into a tilted position transmit a substantial torque, and thus a substantial force onto the welded seam on the lateral outer surface of the torsion tube by means of which these are fastened on the torsion tube. These torsion tubes are also usually mounted between two support pylons or support posts, such that these exhibit a greater flexure than a lattice frame support structure that extends over a plurality of support pylons or support posts.

The essential disadvantage of the design of known parabolic mirror support structures for forming a parabolic trough collector therefore consists in the fact that it is impossible to form a mirror surface that is continuous in the parabolic trough collector in the longitudinal direction, because there are formed between individual elements or parabolic trough collector sections there support pylons or drive pylons that project into the region of the mirror surface such that transverse strip regions in which no mirror elements or no silvered surface can be arranged are always present. Moreover, the known lattice frame constructions incur relatively high production costs occur because of the expensive metal construction and the need to provide gusset plates for transmitting the forces for the purpose of tracking the parabolic trough collectors.

SUMMARY

It is therefore the object of the invention to provide a solution with the aid of which it is possible to reduce the design outlay for the production of a parabolic mirror support structure, and to increase the useful mirror surface.

In the case of a parabolic trough collector of the type designated in more detail at the beginning, this object is achieved according to the invention by virtue of the fact that the torsion tube is arranged in such a way that the parabolic trough collector longitudinal rotation axis coincides with the central longitudinal axis of the torsion tube.

The invention is directed toward a parabolic trough collector comprising a parabolic mirror support structure with a parabolic mirror surface applied thereto, and an absorber support structure supporting an absorber tube, the two support structures being mechanically fastened in a fixed position relative to one another on a torsion tube that is arranged below the parabolic mirror surface, and being mounted together with the latter in a fashion capable of rotation about a parabolic trough collector longitudinal rotation axis.

Consequently, according to the invention firstly the rotation axis of the parabolic trough collector is arranged below the parabolic mirror surface, and secondly the rotation axis runs through the center of the torsion tube. This renders it possible to effect the rotational movement and swiveling movement of the parabolic trough collector solely by swiveling the torsion tube through forces acting thereon. Since the torsion tube is arranged below the mirror surface, and the parabolic trough collector is swiveling about the central axis of the torsion tube, it is now possible to form a continuous mirror surface over the entire length of the torsion tube above the same. The mounting and the complete driving of the parabolic trough collector can be formed and arranged below the parabolic mirror surface. It is thereby possible for the active mirror surface referred to a given length of a torsion tube or of a parabolic trough collector to be increased by 5% as against the previously known prior art. At the same time, by comparison with lattice frame support constructions torsional stiffness is improved is achieved by the use of the torsion tube, since the lattice frame torsion boxes usually formed have a poorer torsional stiffness than a tube.

In addition to the greater area utilization, the advantages associated with the continuous or uninterrupted and enlarged mirror surface consist in an improved cleanability of the mirror surface, and in a greater utilization of the length of the heat-carrying tube.

In order to furnish a torsion tube with a flexural behavior at least approximately the same as a lattice frame structure, in a development the invention is distinguished by the fact that the torsion tube is designed as a continuous beam/girder. Here, continuous beam/girder is understood as multispan girders of a beam framework or supporting framework that are known from mechanics and reach over more than two supports, such as is known from statics. A continuous torsion tube, or one designed as a continuous beam/girder is distinguished in that it is supported over its length on a plurality of support pylons or support posts arranged spaced apart from one another, and/or is supported thereon. It is hereby possible to form virtually arbitrarily long parabolic trough collectors and torsion tubes supporting these, it being possible to reduce their flexure to the desired or tolerated measure through the spaced-apart positioning of the support pylons or support posts at suitable and calculated points.

It is hereby possible to form not only continuous mirror surfaces, but also relatively long parabolic trough collectors and/or parabolic trough collector elements from which the respective parabolic trough collectors are constructed. Likewise, the initially present disadvantage of a tube with regard to its relatively large flexure as against support frame lattice constructions is cancelled and compensated by this measure.

The advantages of the continuous or uninterrupted torsion tube consist in its higher torsional stiffness and its higher flexural strength, since no interruption is present owing to an interruption in the region of a pylon or support post.

Furthermore, on the basis of the possibilities resulting from the mechanical configuration of the parabolic trough collector, the parabolic trough collector is distinguished in accordance with the invention by the fact that it has a parabolic mirror surface designed to be continuous in the longitudinal direction of the torsion tube and to be substantially free from interruption.

In accordance with a refinement of the invention, it is then hereby expedient for the design of the parabolic mirror surface when the parabolic mirror surface is formed from mirror surfaces respectively having rows of parabolic mirror elements lying one against another without spacing.

Furthermore, it is hereby advantageous when the continuous parabolic mirror surface extends substantially over the length of the continuous beam/girder, and the invention likewise provides for this.

In accordance with a development of the invention, the torsion tube can be supported and mounted in a fashion particularly favorable to implement by virtue of the fact that the torsion tube is supported and/or mounted in sliding or roller bearings arranged on support pylons or support posts. With this novel mounting concept, it is possible to use the torsion tube in a simple way as a force transmission element for swiveling the parabolic trough collector. Since the torsion tube is arranged below the mirror surface, it is to be mounted in a supported fashion as a matter of course on conventional sliding bearings or roller bearings that permit a rotational movement of the torsion tube.

In order to ensure that the centroidal line of the torsion tube and/or of the parabolic trough collector lies respectively in the rotation axis of the torsion tube, the invention further provides that counterweights are arranged on the side of the torsion tube averted from the parabolic mirror surface in such a way that the centroidal line/axis of the parabolic trough collector and/or of the torsion tube coincide(s) at least substantially with the parabolic trough collector longitudinal rotation axis.

In accordance with a further refinement of the invention, this can be achieved in particular by the fact that the counterweights are arranged adjacent to support pylons or support posts supporting the torsion tube. In the case of a beam clamped at both ends, it is known that elastic axis runs in the vicinity of the bearing through "O", which means that no flexural torques exist in the beam at this point. The solid counterweights are fitted in particular at these points.

Because the parabolic trough collector longitudinal rotation axis and the central longitudinal axis of the torsion tube coincide and, moreover, in particular the centroidal axis or the centroidal line is also then identical to the rotation axis of the parabolic trough collector, there is a reduction in the drive torques and a reduction in the distortion of the torsion tube toward the longitudinal end of the parabolic trough collector.

Finally, in a further refinement the invention is also further distinguished in that the absorber support structure comprises support elements passing diametrically through the torsion tube. Because the absorber structure supporting the absorber—which in the exemplary embodiment takes the form of individual support posts supporting the absorber tube—are guided diametrically through the cross section of the torsion tube, such a support post is respectively mechanically supported at two regions, spaced apart and diametrically opposite one another, of the lateral surface of the torsion tube, as well as also being fastened by welding at the two points, if appropriate. As a result, the torque respectively exerted by such a support post during swiveling of the parabolic trough collector is absorbed, and a deformation or buckling of the torsion tube is avoided. There is no need to use complicated and expensive gusset plates.

The invention is explained in more detail below by way of example with the aid of a drawing, in which:

DETAILED DESCRIPTION

Figure 1:
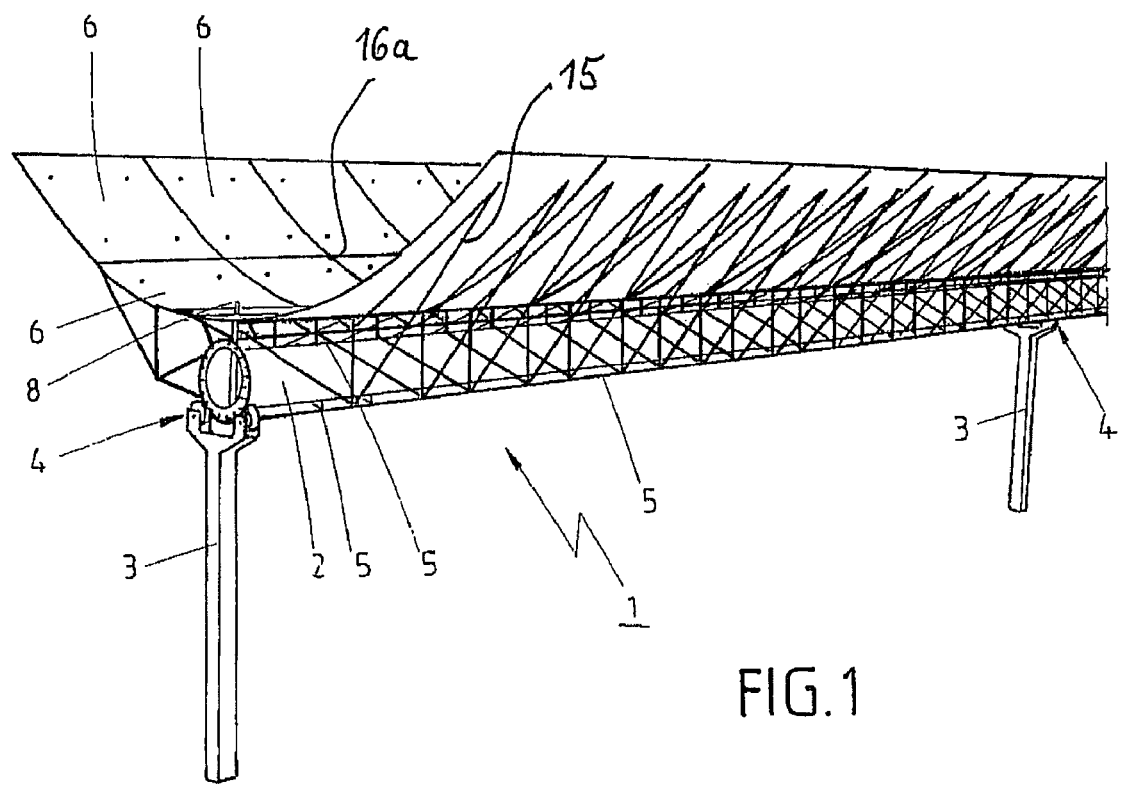
FIG. 1 is a perspective schematic of an inventive parabolic trough collector.
Figure 2:
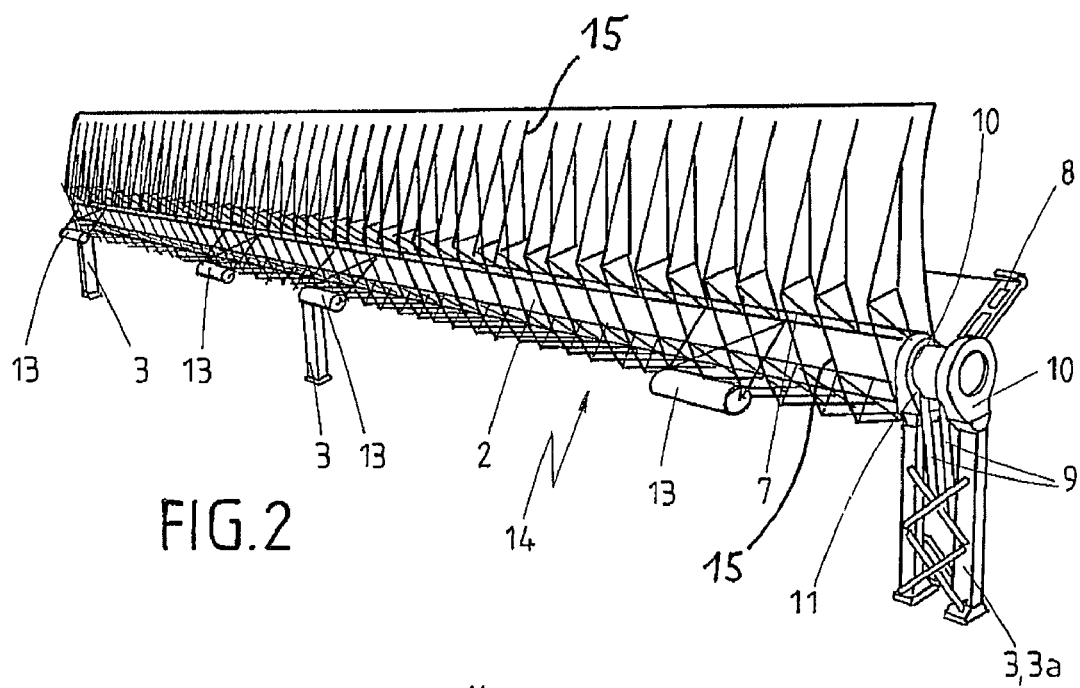
FIG. 2 is a schematic of a parabolic trough collector or of an element of a parabolic trough collector with a view onto the rear side of the mirror surface.
Figure 3:
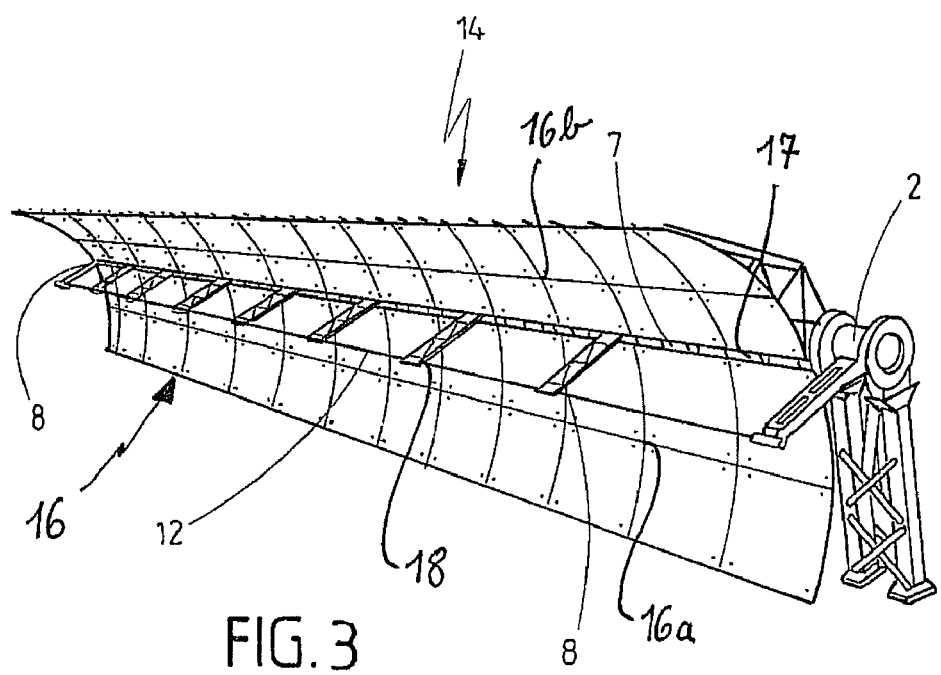
FIG. 3 is a schematic of a view onto the mirror surface of a parabolic trough collector or parabolic trough collector element.

FIG. 1 shows a parabolic mirror support structure 1 that comprises a torsion tube 2 mounted on two support pylons 3. The torsion tube 2 is rotatably supported in this case on roller bearings 4 arranged on the support pylons 3. Support arms 15 in the form of lattice frame constructions are arranged on the torsion tube 2 on fastening lugs 5 formed in a fashion fastened on the lateral surface of the torsion tube 2. Parabolic mirror elements 6 are fastened on these support arms 15, and thus on the parabolic mirror support structure 1, without spacings in the longitudinal direction of the torsion tube 2, and preferably in a fashion lying one against another without seams so as respectively to produce a continuous mirror surface 16a, 16b in the longitudinal direction of the torsion tube. Only at the vertex 17 of the parabolic profile of parabolic mirror elements 6 lined up one against another does there result a continuous longitudinal slot 7 through which support elements 8 of the absorber support structure extend in a fashion projecting from the lateral surface of the torsion tube 2. In the exemplary embodiment, each continuous mirror surface 16a, 16b is respectively formed from two rows, lying against one another without spacings, of respectively twelve times twenty four mirror elements 6, although other combinations or embodiments are also possible. The parabolic mirror support structure 1 illustrated in FIGS. 1 to 3 is a basis for a parabolic trough collector 14 formed therefrom, or a parabolic trough collector element. The mirror surfaces 16a and 16b respectively form the parabolic mirror surface 16 of a parabolic trough collector 15 or of a parabolic trough collector element.

As may be seen from FIG. 2, the torsion tube 2 is a torsion tube designed as a continuous beam/girder, which is supported on three support pylons 3 in particular, the right-hand support pylon 3a in FIG. 2 being designed at the same time as a drive pylon or drive post. Constructed on the support posts of the drive pylon 3a for the purpose of swiveling the torsion tube 2 are two hydraulic cylinders 9 that act on drive lugs 10 and thereby enable the torsion tube 2 to rotate and swivel in the roller bearings 4 and in the sleeve bearing 11 formed in the region of the drive pylon 3a. The support elements 8 run and engage diametrically through the cross sectional surface of the torsion tube 2 from top to bottom, and are fastened on the torsion tube 2 at the two regions of contact via the lateral surface of the torsion tube.

The torsion tube 2 is arranged below the mirror surfaces 16a, 16b formed by the parabolic mirror elements 6, and is mounted in such a way that the longitudinal rotation axis of the parabolic trough collector coincides with the central longitudinal axis of the torsion tube 2.

An absorber tube 12 which carries heat-carrying medium is arranged, lying opposite the longitudinal slot 7, on that end of the support elements 8 averted from the torsion tube 2. Both the parabolic mirror support structure 1 with the parabolic mirror surfaces 16a, 16b applied thereto by means of the parabolic mirror elements 6, and the absorber support structure 18 comprising support elements 8 supporting the absorber tube 12 are fastened on the torsion tube 2 in such a way that they remain in a fixed position relative to one another even given swiveling of the parabolic trough collector 14, and are mounted together in a fashion capable of rotation about the longitudinal rotation axis of the parabolic trough collector, which leads through the middle of the torsion tube 2.

Solid counterweights 13 are arranged on the torsion tube 2 on its side averted from the parabolic mirror surfaces 16a, 16b in such a way that the centroidal line/axis of the parabolic trough collector 14 and/or of the torsion tube 2 coincides at least substantially with the longitudinal rotation axis of the parabolic trough collector. Here, the counterweights 13 are arranged adjacent to the support pylons 3, 3a or support posts supporting the torsion tube 2.

In a way not illustrated, the roller bearings 4 can also be designed as sliding bearings. It is likewise possible to use a lubricant in order to enable troublefree swiveling of the torsion tube 2 in the respective bearing.

The control and tracking of the parabolic trough collector are performed by means of known Sun sensors and by means of known and conventional control loops.

Having described the invention, and a preferred embodiment thereof, what is claimed as new and secured by Letters Patent is:

1. A parabolic trough collector comprising
a parabolic mirror support structure with a parabolic mirror surface applied thereto, and
an absorber support structure supporting an absorber tube,
the parabolic mirror support structure and the absorber support structure being mechanically fastened in a fixed position relative to one another on a torsion tube that is arranged below the parabolic mirror surface, and being mounted together with the parabolic mirror surface in a fashion capable of rotation about a parabolic trough collector longitudinal rotation axis,
wherein
the torsion tube is arranged such that the parabolic trough collector longitudinal rotation axis coincides with the central longitudinal axis of the torsion tube.

2. The parabolic trough collector as claimed in claim 1, wherein the torsion tube is designed as a continuous beam/girder.

3. The parabolic trough collector as claimed in claim 2, wherein the torsion tube is supported and/or mounted in sliding or roller bearings arranged on support pylons or support posts.

4. The parabolic trough collector as claimed in claim 2, wherein counterweights are arranged on the side of the torsion tube averted from the parabolic mirror surface in such a way that the centroidal line/axis of the parabolic trough collector and/or of the torsion tube coincide(s) at least substantially with the parabolic trough collector longitudinal rotation axis.

5. The parabolic trough collector as claimed claim 2, wherein the absorber support structure comprises support elements passing diametrically through the torsion tube.

6. The parabolic trough collector as claimed in claim 2, wherein the parabolic mirror surface is continuous in the longitudinal direction of the torsion tube and substantially free from interruption.

7. The parabolic trough collector as claimed in claim 1, wherein the parabolic mirror surface is continuous in the longitudinal direction of the torsion tube and substantially free from interruption.

8. The parabolic trough collector as claimed in claim 7, wherein the continuous parabolic mirror surface extends substantially over the length of the continuous beam/girder.

9. The parabolic trough collector as claimed in claim 7, wherein the torsion tube is supported and/or mounted in sliding or roller bearings arranged on support pylons or support posts.

10. The parabolic trough collector as claimed in claim 7, wherein counterweights are arranged on the side of the torsion tube averted from the parabolic mirror surface in such a way that the centroidal line/axis of the parabolic trough collector and/or of the torsion tube coincide(s) at least substantially with the parabolic trough collector longitudinal rotation axis.

11. The parabolic trough collector as claimed claim 7, wherein the absorber support structure comprises support elements passing diametrically through the torsion tube.

12. The parabolic trough collector as claimed in claim 7, wherein the parabolic mirror surface is formed from mirror surfaces respectively having rows of parabolic mirror elements lying one against another without spacing.

13. The parabolic trough collector as claimed in claim 12, wherein the continuous parabolic mirror surface extends substantially over the length of the continuous beam/girder.

14. The parabolic trough collector as claimed in claim 1, wherein the torsion tube is supported and/or mounted in sliding or roller bearings arranged on support pylons or support posts.

15. The parabolic trough collector as claimed in claim 14, wherein counterweights are arranged on the side of the torsion tube averted from the parabolic mirror surface in such a way that the centroidal line/axis of the parabolic trough collector and/or of the torsion tube coincide(s) at least substantially with the parabolic trough collector longitudinal rotation axis.

16. The parabolic trough collector as claimed claim 14, wherein the absorber support structure comprises support elements passing diametrically through the torsion tube.

17. The parabolic trough collector as claimed in claim 1, wherein counterweights are arranged on the side of the torsion tube averted from the parabolic mirror surface in such a way that the centroidal line/axis of the parabolic trough collector and/or of the torsion tube coincide(s) at least substantially with the parabolic trough collector longitudinal rotation axis.

18. The parabolic trough collector as claimed in claim 17, wherein the counterweights are arranged adjacent to the support pylons or support posts supporting the torsion tube.

19. The parabolic trough collector as claimed claim 17, wherein the absorber support structure comprises support elements passing diametrically through the torsion tube.

20. The parabolic trough collector as claimed claim 1, wherein the absorber support structure comprises support elements passing diametrically through the torsion tube.

* * * * *